Figure 3:
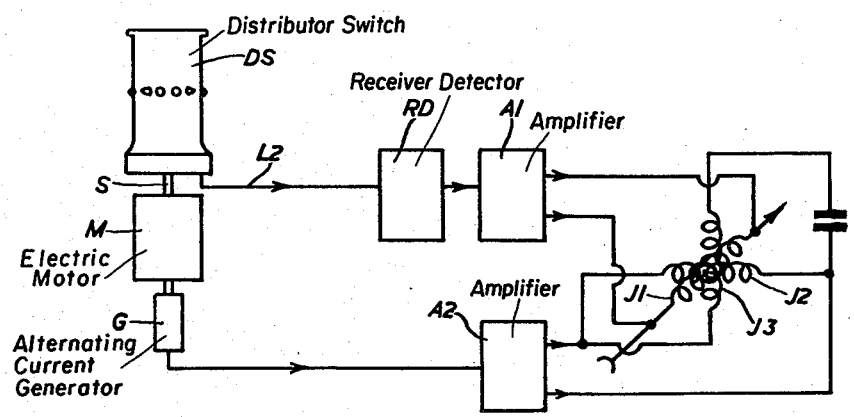

Nov. 29, 1960     D. BYATT     2,962,715
RADIO DIRECTION FINDING SYSTEMS
Filed Oct. 29, 1956     4 Sheets-Sheet 1
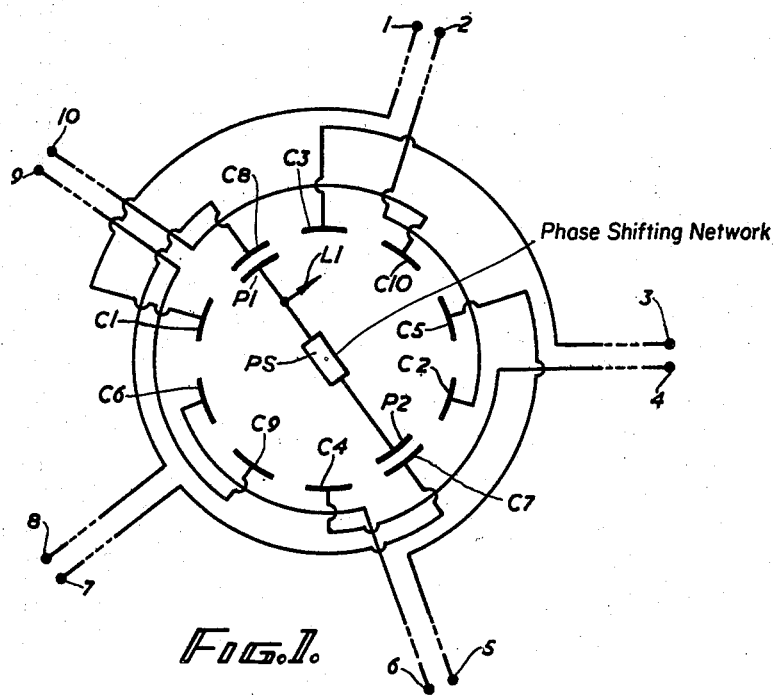
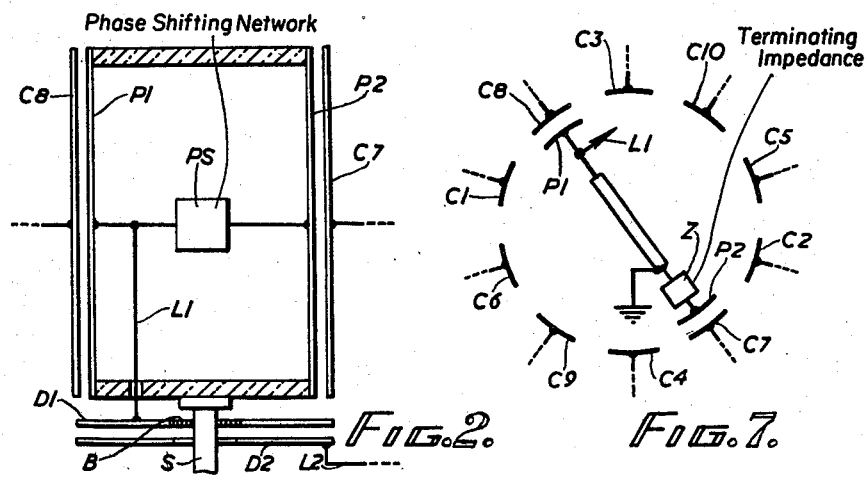
INVENTOR:
Dennis Byatt
BY: Baldwin & Wight
ATTORNEYS Nov. 29, 1960     D. BYATT     2,962,715
RADIO DIRECTION FINDING SYSTEMS
Filed Oct. 29, 1956     4 Sheets-Sheet 3

INVENTOR:
Dennis Byatt
BY: Baldwin & Wight
ATTORNEYS

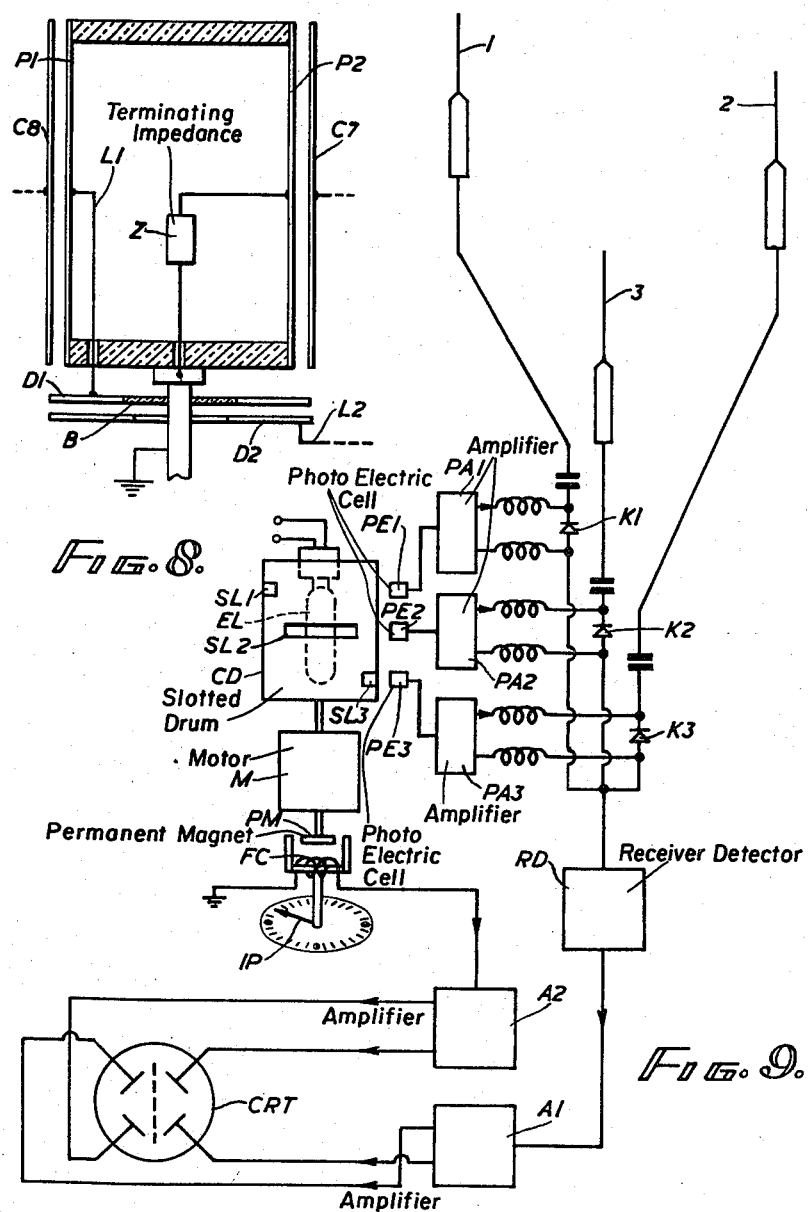

United States Patent Office 2,962,715
Patented Nov. 29, 1960

2,962,715
RADIO DIRECTION FINDING SYSTEMS

Dennis Byatt, Chelmsford, England, assignor to Marconi's Wireless Telegraph Company Limited, London, England, a British company Filed Oct. 29, 1956, Ser. No. 618,984

Claims priority, application Great Britain Nov. 23, 1955

5 Claims. (Cl. 343—120)

This invention relates to radio direction finding systems and though not limited to its application thereto is particularly suitable for use in connection with high frequency radio direction finders.

In practice much difficulty has been experienced in obtaining accurate and reliable directional readings of incoming signals, particularly very high frequency signals, and known direction finders often give uncertain and fluctuating bearing information more especially as respects signals originating from a source which is near the direction finding system. This is very objectionable in the case of navigation aiding direction finding systems for determining the bearing of an aircraft transmitting the signals in question, for it is precisely when the aircraft is near the direction finding system that accurate and reliable bearing information is required to be quickly obtained. In general, the fluctuations and uncertainties which are exhibited by known direction finding systems are due to non-uniformities in the incoming wave front. Such non-uniformities may result from any of a variety of causes, notably multiple reflections from the ionosphere and (in cases in which the direction finder makes use of elevated aerial systems) the effect of polarization lobes of the aerials employed.

The principal object of the present invention is to provide improved radio direction finders which will give comparatively steady and reliable bearing information and which shall be at the same time of relatively simple and economical construction and arrangement and easy to install and set up.

In the preferred embodiments of the invention a considerable degree of improved steadiness and reliability as compared with comparable known systems is obtained by constructing the direction finder to have what may be termed a wide "aperture" so that non-uniformities in the disposition of the incoming wave front become of greatly reduced overall effect. The invention, however, also provides improved direction finders which, though admittedly not so good from the point of view of steadiness and reliability as the preferred embodiments are, nevertheless, quite good and have the advantage of very great simplicity.

According to this invention a radio direction finding system comprises a plurality of directional aerial arrangements each having maximum reception in a different direction in the circle of azimuth, continuously driven means for taking received signals successively from the different aerial arrangements, a source of reference frequency synchronized with said continuously driven means, receiving and detecting means for the successively taken signals and means responsive to the phase relation between the detected signals and the reference frequency for indicating an incoming signal direction.

Preferably there is a ring of pairs of aerials, the aerials of each pair being spaced substantially one quarter of a wavelength apart and the continuously driven means comprise means for successively coupling the pairs to the receiving and detecting means through circuits of which that from one aerial of a pair introduces a phase shift of 90° in relation to that from the other aerial of said pair, whereby the two aerials of a pair, when coupled to the receiving and detecting means, constitute a directional aerial arrangement. Alternatively said driven means may comprise means for successively coupling to the pairs in such manner as to couple one aerial of a pair to the receiving and detecting means and the other aerial of that pair to a termination adapted to cause said other aerial to act as a reflector with respect to said one aerial.

Preferably also the diameter of the ring of pairs of aerials is of the order of several wavelengths and there are at least five pairs of aerials in the ring.

The continuously driven means may conveniently be constituted by a capacitative distributor switch comprising a ring of fixed plates with each diametrically opposite pair thereof connected to the aerials of the same pair, and two coupling plates situated on a diameter and rotated together, the coupling plates having a common path of motion which extends round and is adjacent to the ring in which the fixed plates lie whereby, during rotation, the coupling plates come successively into capacity coupling relation with the different diametrically opposite pairs of fixed plates.

In a further embodiment, which has the advantage of great simplicity but is not otherwise preferred, there are only three aerials, arranged at equal intervals round a circle and spaced at a quarter of a wavelength apart and the continuously driven means are arranged to couple each aerial successively to the receiving and detecting means while leaving the other two aerials with high impedance terminations to constitute reflectors with respect to the coupled aerial, whereby, for each different position of the continuously driven means, the three aerials constitute a different directional aerial arrangement with a different direction of maximum reception.

Figure 4:
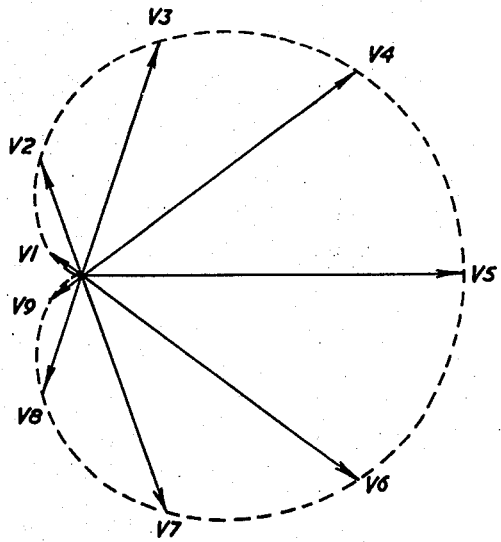
Figure 5:
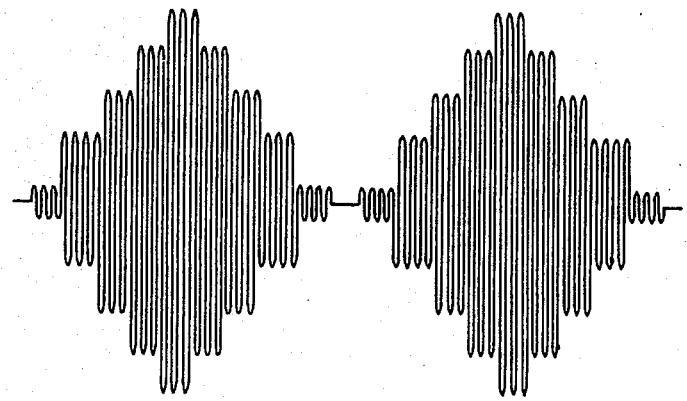
Figure 6:
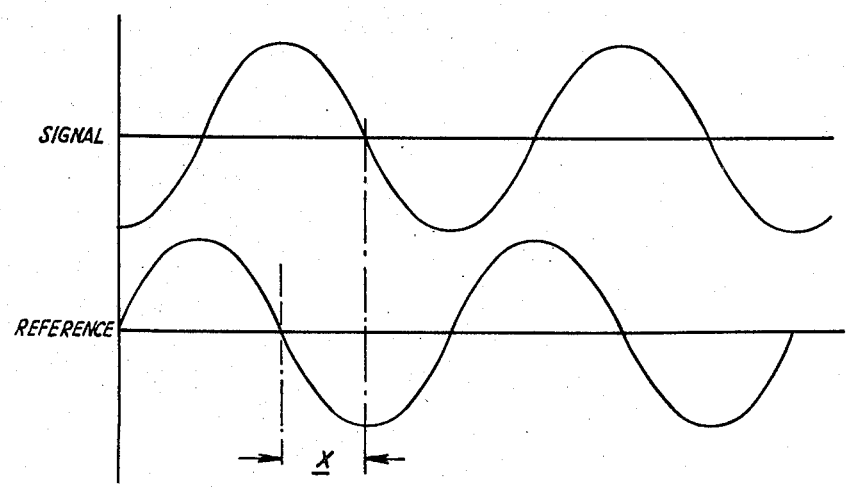

The invention is illustrated in and further explained in connection with the accompanying drawings in which Fig. 1 is a schematic representation of the aerials installation of a preferred embodiment showing also the greater part of a capacitative distributor switch employed in association with said aerial system; Fig. 2 is a diagrammatic sectional elevation showing a convenient mechanical construction for the distributor switch employed in the embodiment of Fig. 1; Fig. 3 is a diagrammatic representation of the whole embodiment (less the aerials and feeders) to which Figs. 1 and 2 relate; Figs. 4, 5 and 6 are explanatory graphical figures; Fig. 7 shows in highly simplified diagrammatic form a modification of the arrangement of Fig. 1; Fig. 8 is a view like that of Fig. 2 showing the distributor switch of Fig. 7; and Fig. 9 is a diagrammatic representation of a further embodiment which has the advantage of great simplicity, but is not otherwise preferred.

Referring to Fig. 1, 1 to 10 inclusive are vertical aerials arranged in pairs, 1 and 2, 3 and 4, 5 and 6, 7 and 8, 9 and 10 at equal intervals round a circle whose diameter is large with reference to the working wavelength, for example, four times the working wavelength. The aerials of each pair are separated by about one quarter of a wavelength. The individual aerials are connected through feeders as indicated to capacity plates C1 to C10 which form part of the capacitative distributor switch also represented in Fig. 2. The plates C1 to C10 are arranged round a circle and as will be seen from Fig. 1, aerial 1 is connected to plate C1, aerial 2 to plate C2, aerial 3 to plate C3 . . . and so on, while the plates themselves are so arranged that those connected to the aerials of a pair are diametrically opposite one another. The moving part of the switch comprises a pair of coupling plates P1 and P2 arranged on a diameter and adapted to sweep over the fixed plates in capacitative relationship thereto. In the position shown in Fig. 1, plate P1 couples with plate C8 and therefore with aerial 8 and plate P2 couples with plate 7 and therefore with aerial 7. Assuming clockwise rotation coupling will occur in the next position with the plates C3 and C4. The connection from the plate P2 includes a 90° phase shifting network PS, the other terminal of which is connected to the plate P1 and to a lead L1 (shown both in Figs. 1 and 2) and which extends to a disc electrode D1. This electrode is mounted on the driving shaft S for the moving part of the switch and is insulated therefrom by a centre insulating bush B. In fixed capacitative coupling with the metal disc D1 is a second metal disc D2 which is stationary and has a centre aperture through which the shaft S passes. An output connection L2 is connected to the disc D2.

Referring to the general arrangement of Fig. 3 (in which the aerials and their feeders are not shown), the unit DS represents the distributor switch of Figs. 1 and 2, the lead L2 of Fig. 3 being the same as the correspondingly referenced lead L2 of Fig. 2 and the shaft S being the same shaft in Figs. 2 and 3. The shaft S is rotated by an electric motor M at some suitable speed, for example 1500 r.p.m. The motor M also drives a source of reference frequency constituted by an alternating current generator G which thus produces a frequency synchronized with the frequency with which the plates P1 and P2 sweep over the plates C1 to C10. If the motor speed is 1500 r.p.m. the reference generator frequency would be 25 c./s.

The output from the switch is fed over lead L2 to a receiver-detector RD the detected output from which is amplified by an amplifier A1 selective to the frequency of 25 c./s. The reference frequency from the generator G is amplified by another amplifier A2 also selective to 25 c./s.

The direction of an incoming signal is indicated by any suitable indicator responsive to the phase difference between the outputs from the amplifiers A1 and A2. The indicator shown comprises a moving coil J1 diagrammatically represented as carrying a pointer and which is mounted to rotate within the field of two mutually perpendicular stator coils J2 and J3 which are fed in quadrature from the amplifier A2.

It will be seen that with this arrangement each pair of aerials serves in turn as a directional aerial arrangement giving a polar diagram of the cardioid type. Thus with the parts in the position shown in Fig. 1 aerials 7 and 8 will provide a cardioid polar diagram which will be reversed in sense when the plates P1 and P2 exchange position. As the plates P1 and P2 rotate the direction of maximum reception will swing through the azimuth circle.

The operation of the system will be more clear from Figs. 4, 5 and 6. As the distributor switch rotates the amplitudes of the signals passed to the receiver-detector RD will change in accordance with the lengths of the vectors V1 to V9. The tenth vector does not appear since it is theoretically of zero length. The cardioid diagram which joins the ends of the vectors is shown dotted in Fig. 4. Accordingly there will appear at the input of the receiver-detector an amplitude modulated signal as shown in Fig. 5, the fundamental frequency of the amplitude modulation being determined by the rate of rotation of the plates P1 and P2, and being, in the example now being described, 25 c./s. This amplitude modulated signal is detected by the unit RD and the fundamental frequency of 25 c./s. is separated and amplified by the amplifier A1, the output of which will consist of a 25 c./s. wave in a particular phase as shown by the upper sinusoidal curve indicated by the word "Signal" in Fig. 6. The A.C. reference signal from the generator G is also amplified by the amplifier A2 whose output will be as represented by the lower sinusoidal curve indicated by the word "Reference" in Fig. 6. The phase relation of these two curves is a measure of the direction of the incoming signal and is given by the relative phase shift X in Fig. 6. This relative phase shift is indicated by the instrument consisting of the coils J1, J2 and J3, the pointer of which may be arranged to read direction against a suitable scale (not shown).

Figs. 7 and 8 illustrate, so far as is necessary to an understanding thereof, a modification of the arrangement of Figs. 1 and 2. In Fig. 7 only one aerial of a pair (in the position shown in the figure this is the aerial connected to plate C8) is coupled, at any given time, to the receiving and detecting means and the other aerial of that pair is coupled to earth through a terminating impedance Z so dimensioned, in accordance with well known principles, as to cause said other aerial to act as a reflector with respect to said one aerial so that the pair produce a cardioid polar diagram. The elongated rectangle shown in Fig. 7 between the lead L1 and the impedance Z is, of course, not an electrical connection but represents merely the mechanical connection by which the plates P1 and P2 are caused to rotate together.

In view of the description already given of Figs. 1 and 2 it is thought that no further description of Figs. 7 and 8 is necessary.

Fig. 9 shows a modification which admittedly does not give such good results as the foregoing embodiments because there are fewer aerials and they do not provide so wide an "aperture" and there is, therefore, a suitably smaller degree of independence of non-uniformities in the incoming wave front. However, Fig. 9 has the advantage of great simplicity.

Referring to Fig. 9 there are three aerials, 1, 2 and 3 in the form of vertical coaxial dipoles arranged at 120° round a circle and each separated from its neighbor by a distance of about one quarter of the working wavelength. The aerials are connected successively to a receiver-detector RD through switched circuits so arranged that the two aerials which at any moment are not effectively connected to the receiver-detector have high impedance terminations so that they act as reflectors in relation to the aerial which is effectively so connected. Thus the three aerials provide between them a cardioid type of diagram with a direction of maximum reception which rotates round the circle of azimuth as the switching proceeds, the same three aerials serving to constitute three differently directional aerial arrangements in succession. In the embodiment shown the required cyclic switching is effected by cyclically controlling the conductivity of three crystals K1, K2 and K3, one in each of the paths from the aerials to the receiver-detector. The control of the crystal conductivities is effected by three photo-electric cells PE1, PE2 and PE3, whose outputs are amplified by amplifiers PA1, PA2 and PA3 respectively and which are themselves controlled by light energization provided by a continuously running device driven, for example, at 1500 r.p.m. by the motor M. This device consists of a cylindrical drum CD having three slots SL1, SL2 and SL3, each embracing 120° of the periphery, cut in its surface. Within the drum is an electric lamp EL. It will be seen that, as the drum rotates, the photo-electric cells are illuminated in turn and each in turn provides a square wave output, the duration of each square being one-third of the time taken by the drum to make one revolution. When any cell is illuminated its associated amplifier provides an output bias which renders the associated crystal conductive, the other two cells being, of course, in darkness and the other two crystals therefore non-conductive. The motor M drives an A.C. generator which is purely schematically represented and which comprises a permanent magnet PM on the motor shaft and a field or inductor coil FC magnetically linked thereto. The field coil system can be rotated by a handle (not shown) and carries a pointer IP moving over a scale. The output from the receiver-detector RD is amplified by a 25 c./s. selective amplifier A1 and that from the coil FC is amplified by a similar amplifier A2. A cathode ray tube with mutually perpendicular pairs of deflector plates is conventionally indicated at CRT, one pair of plates being fed from the amplifier A1 and the other from the amplifier A2. The outputs from these amplifiers are adjusted to amplitude equality for application to the deflector plates of the cathode ray tube. With this arrangement it is possible by rotating the coil FC to bring the outputs from the two amplifiers A1 and A2 into phase. The achievement of this adjustment is indicated by the appearance of a straight line in a particular angular position across the screen of the tube. In a tube with deflector plates as indicated this angular position is that in which the line is at 45° to the planes of the deflector plates. This is indicated by a dotted line in Fig. 9. When this adjustment has been achieved the position of the pointer IP on the scale will indicate the incoming signal direction.

I claim:

1. A radio direction finding system comprising a plurality of directional aerial arrangements each having maximum reception in a different direction in the circle of azimuth and comprising pairs of aerials, each pair consisting of two aerials spaced one quarter wavelength from each other, said pairs being arranged uniformly and consecutively around a substantial circle, continuously driven means for taking received signals successively from the different aerial arrangements to produce amplitude modulated signals, a source of reference frequency synchronized with said continuously driven means, receiving and detecting means for the successively taken signals, and means responsive to the phase relation between the amplitude variation of the detected signals and the reference frequency for indicating an incoming signal direction.

2. A radio direction finding system comprising a plurality of directional aerial arrangements each having maximum reception in a different direction in the circle of azimuth and comprising pairs of aerials, each pair consisting of two aerials spaced one quarter wavelength from each other, said pairs being arranged uniformly and consecutively around a substantial circle, continuously driven means for taking received signals successively from the different aerial arrangements, a source of reference frequency synchronized with said continuously driven means, receiving and detecting means for the successively taken signals and means responsive to the phase relation between the detected signals and the reference frequency for indicating an incoming signal direction, wherein the continuously driven means comprise means for successively coupling the said pairs of aerials to the receiving and detecting means through circuits of which that from one aerial of a pair introduces a phase shift of 90° in relation to that from the other aerial of said pair, whereby the two aerials of a pair, when coupled to the receiving and detecting means, constitute a directional aerial arrangement.

3. A radio direction finding system comprising a plurality of directional aerial arrangements each having maximum reception in a different direction in the circle of azimuth and comprising pairs of aerials, each pair consisting of two aerials spaced one quarter wavelength from each other, said pairs being arranged uniformly and consecutively around a substantial circle, continuously driven means for taking received signals successively from the different aerial arrangements, a source of reference frequency synchronized with said continuously driven means, receiving and detecting means for the successively taken signals and means responsive to the phase relation between the detected signals and the reference frequency for indicating an incoming signal direction, wherein the continuously driven means comprise means for successively coupling to the pairs in such manner as to couple one aerial of a pair to the receiving and detecting means and the other aerial of that pair to a termination adapted to cause said other aerial to act as a reflector with respect to said one aerial.

4. A radio direction finding system comprising a plurality of directional aerial arrangements each having maximum reception in a different direction in the circle of azimuth and comprising pairs of aerials, each pair consisting of two aerials spaced one quarter wavelength from each other, said pairs being arranged uniformly and consecutively around a substantial circle, continuously driven means for taking received signals successively from the different aerial arrangements, a source of reference frequency synchronized with said continuously driven means, receiving and detecting means for the successively taken signals and means responsive to the phase relation between the detected signals and the reference frequency for indicating an incoming signal direction, wherein the diameter of the circle of pairs of aerials is of the order of several wavelengths and there are at least five pairs of aerials in the circle.

5. A radio direction finding system comprising a plurality of directional aerial arrangements each having maximum reception in a different direction in the circle of azimuth and comprising pairs of aerials, each pair consisting of two aerials spaced one quarter wavelength from each other, said pairs being arranged uniformly and consecutively around a substantial circle, continuously driven means for taking received signals successively from the different aerial arrangements, a source of reference frequency synchronized with said continuously driven means, receiving and detecting means for the successively taken signals and means responsive to the phase relation between the detected signals and the reference frequency for indicating an incoming signal direction, wherein the continuously driven means is constituted by a capacitative distributor switch comprising a ring of fixed plates with each diametrically opposite pair thereof connected to the aerials of the same pair, and two coupling plates situated on a diameter and rotated together, the coupling plates having a common path of motion which extends round and is adjacent to the ring in which the fixed plates lie whereby, during rotation, the coupling plates come successively into capacity coupling relation with the different diametrically opposite pairs of fixed plates.

References Cited in the file of this patent

UNITED STATES PATENTS

| | | |
|---|---|---|
| 2,483,399 | Burroughs | Oct. 4, 1949 |
| 2,494,553 | Hansel | Jan. 17, 1950 |
| 2,502,131 | Earp | Mar. 28, 1950 |
| 2,762,043 | Earp | Sept. 4, 1956 |